United States Patent
Yildirim et al.

(10) Patent No.: US 11,811,506 B2
(45) Date of Patent: Nov. 7, 2023

(54) APPLICATION OF KEY EXCHANGE BASED PHYSICAL LAYER SECURITY METHODS

(71) Applicant: ISTANBUL TEKNIK UNIVERSITESI, Istanbul (TR)

(72) Inventors: Ali Yilmaz Yildirim, Istanbul (TR); Gunes Zeynep Karabulut Kurt, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 377 days.

(21) Appl. No.: 17/312,425

(22) PCT Filed: Feb. 4, 2020

(86) PCT No.: PCT/TR2020/050071
§ 371 (c)(1),
(2) Date: Jun. 10, 2021

(87) PCT Pub. No.: WO2020/162856
PCT Pub. Date: Aug. 13, 2020

(65) Prior Publication Data
US 2022/0094460 A1     Mar. 24, 2022

(30) Foreign Application Priority Data
Feb. 4, 2020   (TR) ................... 2019/01713

(51) Int. Cl.
*H04L 9/00*       (2022.01)
*H04L 9/08*       (2006.01)
*H04K 1/00*       (2006.01)
*H04W 12/0471*    (2021.01)
*H04B 1/713*      (2011.01)
*H04K 1/04*       (2006.01)
*H04L 27/34*      (2006.01)

(52) U.S. Cl.
CPC ............. *H04K 1/003* (2013.01); *H04B 1/713* (2013.01); *H04K 1/006* (2013.01); *H04K 1/04* (2013.01); *H04L 27/3444* (2013.01); *H04W 12/0471* (2021.01); *H04L 9/001* (2013.01); *H04L 9/0841* (2013.01)

(58) Field of Classification Search
CPC ... H04L 9/0841; H04L 9/0656; H04L 9/0662; H04L 9/0816
See application file for complete search history.

(56) References Cited

U.S. PATENT DOCUMENTS 8,787,572 B1 *    7/2014   Tewari .................. H04L 9/3226
                                                         380/255
2016/0212616 A1 * 7/2016   Allen .................. H04L 27/2035

* cited by examiner

*Primary Examiner* — Kevin Kim
(74) *Attorney, Agent, or Firm* — Bayramoglu Law Offices LLC

(57) ABSTRACT

A method making modifications during a key phase of physical layer security methods and enabling the physical layer security methods to be applicable in a wireless communication is provided. The method includes a step of generating a K common key, including steps to be carried out at a modulator during a data transmission phase.

2 Claims, 5 Drawing Sheets

APPLICATION OF KEY EXCHANGE BASED PHYSICAL LAYER SECURITY METHODS

CROSS REFERENCE TO THE RELATED APPLICATIONS

This application is the national stage entry of International Application No. PCT/TR2020/050071, filed on Feb. 4, 2020, which is based upon and claims priority to Turkish Patent Application No. 2019/01713 filed on Feb. 5, 2019, the entire contents of which are incorporated herein by reference.

TECHNICAL FIELD

The invention provides a new point of view regarding the application of physical layer security methods. In the prior art, the key sharing phase in physical layer security methods is carried out with cryptographic methods. The most basic cryptographic method used is the Diffie-Hellman Key exchange protocol.

BACKGROUND

The importance of the data transmitted gains importance every single day, together with the improvement in technology. As a result of this situation, it has become crucially important to provide security in wireless communication. New security methods are being searched for the invention. The security methods that are applied in wireless communication are cryptography methods in the 2nd, 3rd and 7th layers of the OSI reference model. Physical layer security methods that can be used in wireless communication in addition to cryptography methods in order to provide security for the data transmitted are still being searched. Some examples of such security methods are constellation rotation, Chaotic Direct Sequence Spread Spectrum (DSSS), modulation type selection, frequency hopping, and filter-based methods. It is prevented by listeners from obtaining data transmitted by applying these methods during data transmission.

Direct Sequence Spread Spectrum (DSSS)

Direct Sequence Spread Spectrum technology (DSSS), increases the resilience of data against factors that may increase error rate such as interference and noise, by subjecting the data to an XOR process with the data sequence, also referred to as the bit sequence, which is formed of a higher number of bits than those submitted by the transmitter.

In FIG. 1, the DSSS process can be seen. The bit sequence that is to be transmitted is represented with a bit sequence that is several times the bit propagation factor (In this example 4 times) by carrying out XOR.

The DSSS demodulation process that is carried out at the receiver can be observed in FIG. 2. The receiver obtains the bit sequence that the transmitter desired to transmit by subjecting the data sequence obtained by the chip sequence to the XOR process.

A chip sequence having a length determined by the PN (Pseudo Noise) sequence generator is established, the PN generates the sequence generator sequences according to a determined number and this number is one of the generated Kn keys. If the transmitter and the receiver do not have the same chip sequence in DSSS, the receiver cannot obtain the signal transmitted by the transmitter correctly. Thereby the listener is prevented from obtaining a data sequence by means of the chaotic DSSS security method, as the listener does not know the chip sequence. A chip sequence having a determined length is generated by the PN (Pseudo Noise) sequence generator of the transmitter and receiver, and the PN sequence generator generates its sequences according to a determined number. This chip sequence is established according to a key number generated by the authorized transmitter and receiver, secretly from the listener. The unauthorized users that do not have a key cannot obtain the bit sequence transmitted by the transmitter.

Modulation Type Selection

The transmitter transmits the bit sequence that is desired to transmit in communication systems, to the receiver by converting the bit sequence into a representative electromagnetic waveform. This process is called modulation. The bit number and the amplitude and phase of the waveform that is represented with a wave are changed according to modulation types. The exemplary modulation types and the number of bits representing the waveforms in modulation types is 2 for 4-QAM, 3 for 8-QAM and 4 for 16-QAM. The transmitter groups the bit sequences according to modulation types before the modulation process. This process is called "serial to parallel". The amplitude and phase of the waveform that is transmitted are also changed besides the number of bits that are represented. The modulation types used in wireless communication is fixed. The receiver knows the type of modulation transmitted by the transmitter and demodulates the signal that is transmitted accordingly. The principle aim in selecting the modulation type is to prevent the demodulation of data by listeners who do not know the modulation type. When channel losses are added to the transmitted waveforms, the listener cannot demodulate the wave that is transmitted. The critical point in such a security method is that the transmitter shall transmit the modulation type that is to be used by the receiver, secretly from the listener. The common key number that is to be generated with the authorized receiver at the key sharing phase prior to data transmission by the receiver shall be the indicator of the modulation type that is to be used.

Constellation Rotation

The waveforms that represent the bit sequences are illustrated as below, according to their amplitude and phases.

$$a \cdot e^{j\theta}$$

a represents the amplitude of the wave to be transmitted, $\theta$ represents the wave phase. For example, the waveforms transmitted for 4-QAM modulation are $1 \cdot e^{j45°}$, $1 \cdot e^{j135°}$, $1 \cdot e^{j225°}$, $1 \cdot e^{j315°}$. The transmitter adds the same amount of phase to the waveforms during the constellation rotation process.

The transmitter adds the K number that functions as a key and that is also known by the receiver to the phase of the waveforms. The authorized receiver subtracts this K number from the obtained waveforms and converts the waveforms correctly into the related bit sequence. The listeners that do not know the K number cannot obtain the bit sequences correctly. As a result of this process that is called the constellation rotation, the constellation of the authorized receiver and authorized transmitter is changed according to FIG. 4. The K key can be a value between 0-360.

$$a \cdot e^{j(\theta + K)}$$

Filter-Based Physical Layer Security Methods

The transmitter and receiver filter the signal in order to increase the reception performance of the signal by the receiver and to prevent interferences. The structure of the receiver filter and the transmitter filter are connected to each other. The complex conjugation of the transmitter filter is selected in order to minimize interference at the receiver. This concept is called the matched filter. The filters used by the receiver and transmitter in wireless communication systems are called Root Raised Cosine (RRC) filters. The complex conjugation of the coefficients of an RRC filter is the RRC filter itself. RRC filters have a definitive parameter; attenuation factor ($\beta$). The coefficients of the RRC filters change according to the attenuation factor. The attenuation factor is a value between 0 and 1. When the attenuation factor of RRC filters of the receiver and transmitter are the same, the signal reception quality of the receiver increases. The aim of filter-based security methods is to reduce the performance of listeners without affecting the performance of the authorized receiver by changing the attenuation factor of authorized users such that they are parallel with each other. The authorized users decide which attenuation factor to use, with the common K key number that they share in secret from the listener.

Frequency Hopping

After the waveform is passed through the low pass filter in the modulator diagram, it is carried to the $w_c$ frequency and the same frequency is used during the entire transmission. Using the same frequency during the entire transmission enables the communication between the receiver and the transmitter to be perceived by the listener. During the frequency hopping process the transmitter changes the frequencies it used during the entire transmission and the transmitter prevents the data transmitted to be obtained by the listener. The receiver knows which frequency shall be used by the transmitter within which time intervals by means of the common key number generated during the key generation phase. Each key number corresponds to a different frequency hopping model. The transmitter applies the frequency hopping procedure according to the frequency hopping model corresponding to the key number.

All of the mentioned physical layer security methods are formed of two phases. These are the key sharing phase and the data transmission phase. In order to ensure that the authorized receiver is not affected by security methods, the methods are applied according to a key number. This key sharing is carried out before the methods are applied. Following this, these methods are applied during data transmission.

In the prior art, the authorized receiver and the transmitter transmits a pilot symbol to each other within the consistency time of the channel during key sharing. The effect of the channel on pilot symbols is the same. The authorized users can find this effect as they know the pilot symbols. They generate a common key by using the phase or amplitude of the channel effect phase.

In the United States Patent document numbered U.S. Pat. No. 5,604,806A of the prior art, a technique for generating a key from a channel between two authorized users has been disclosed. In the invention, the authorized users transmit pilot symbols to each other. The users calculate the effect of the channel on the pilot symbol amplitude or phase. As it shall be equal with the signals that are transmitted during the consistency time of the channel, a common key can be generated. As the listener cannot access the effect of the channel to the pilot symbol, transmitted between authorized users, the listener cannot obtain the common key that is generated.

In the United States Patent document numbered U.S. Pat. No. 5,604,806A of the prior art, security is provided between authorized users by carrying rotation of waveforms in a constellation diagram. The rotation process is carried out by shifting the complex waveform phases following the con- version of dual sequences to corresponding complex waveforms in the constellation map. The listener who does not know the amount of phase shift, cannot convert the complex waveforms into bit sequences correctly.

In the International patent document numbered CN105916139A of the prior art a relay security method has been developed. The relay is located at a point between the transmitter and the receiver in wireless communication and it received the signal transmitted by the transmitter, it strengthens it and transmits it to the receiver. Relays can obtain the waveform transmitted by the transmitter and re-transmit it; however, they cannot reach the data sequence that is desired to be transmitted. This security method provides a proper solution against bad intentioned relays.

In the International patent document numbered US2012036362 of the known state of the art a novel key exchange protocol is disclosed. Key production methods are not used for generating a common key in physical layer security methods.

In the International patent document numbered US2010153727 of the known state of the art a method that has been developed for secure direct communication between two users is disclosed. This document describes a method of establishing a secure direct communication under medium access control and discloses the application of the Diffie Hellman key exchange protocol in order for the base station not to have a key that is formed between two users. The usage of the generated key for physical layer security methods is not disclosed.

The channel-based key generation methods of the prior art are techniques that theoretically operate smoothly. The consistency time of the channel cannot be determined and in reality, it has an effect that changes according to the frequency of the channel. As a result, it is highly likely for the authorized users to generate a different key. In the studies carried out in the literature, these issues have been disregarded. A common key cannot be generated in multi-receiver communication by means of the channel-based key generation technique.

Another common key generation technique for generating a key for said physical layer security methods is not available aside from the channel-based key generation techniques.

SUMMARY

The aim of the invention to make modifications during the key phase of physical layer security methods and to enable these methods to be applied in wireless communication.

BRIEF DESCRIPTION OF THE DRAWINGS

The method provided in order to reach the aims of the invention has been illustrated below.

In the drawings.

DETAILED DESCRIPTION OF THE EMBODIMENTS

Figure 1:
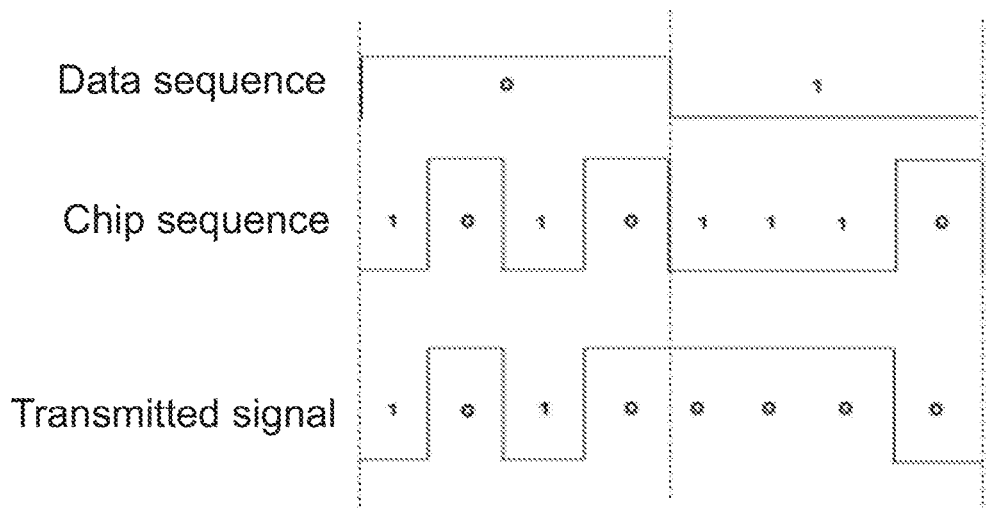
FIG. 1 is the representative DSSS modulation process that is carried out in the prior art. The bit sequence that is to be transmitted is represented with a bit sequence that is several times the bit propagation factor (In this example 4 times) by carrying out XOR.
Figure 2:
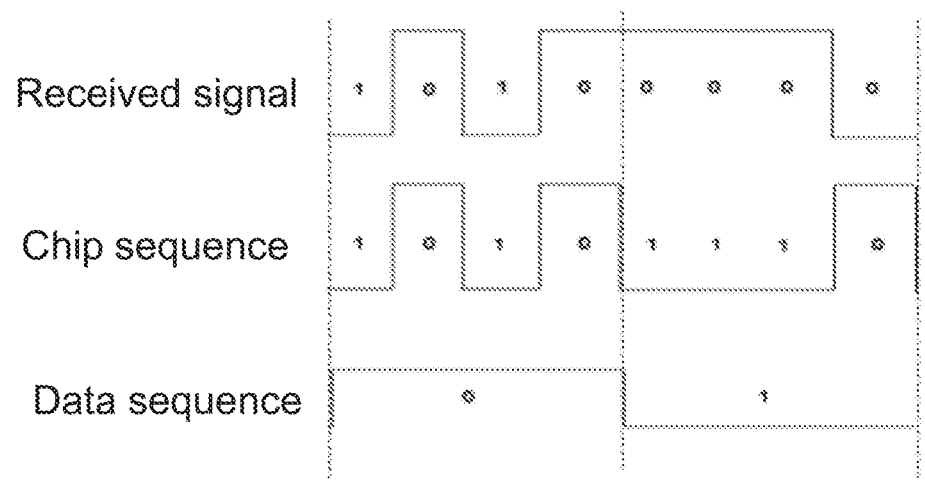
FIG. 2 is the representative DSSS demodulation process that is carried out at the receiver. The receiver obtains the bit sequence that the transmitter desired to transmit by subjecting the data sequence obtained by the chip sequence to the XOR process.
Figure 3:
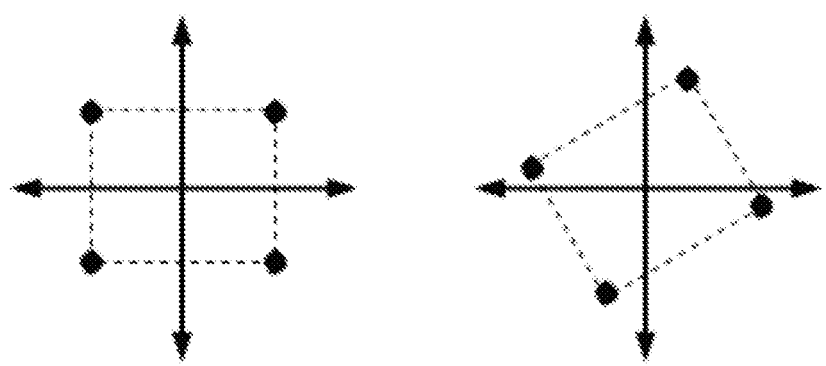
FIG. 3 is the representative constellation rotation of the prior art.
Figure 4:
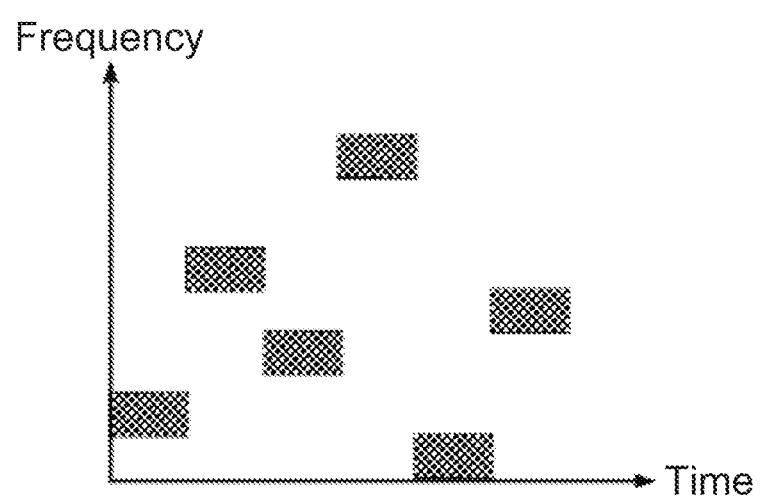
FIG. 4 is the representative view of the frequency hopping method carried out in the prior art.
Figure 5:
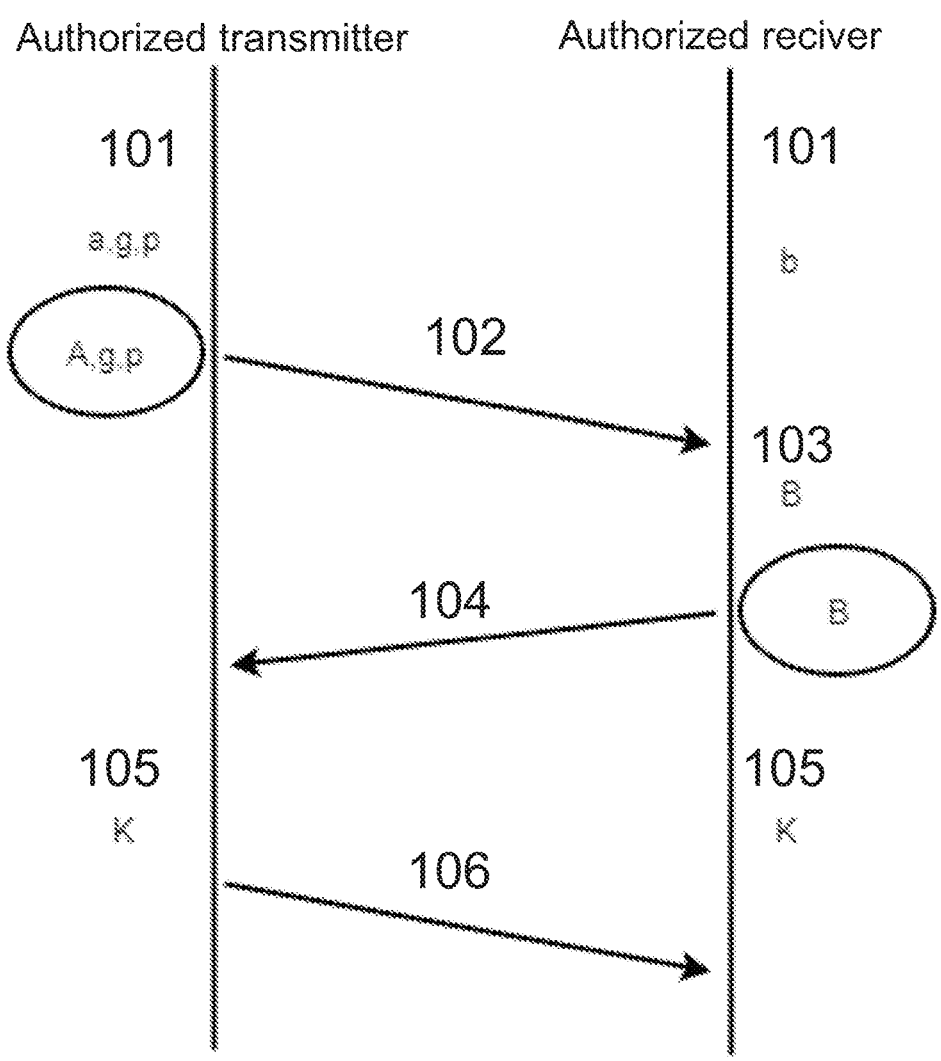
FIG. 5 is the schematic view of the Diffie Hellman key exchange protocol.
Figure 6:
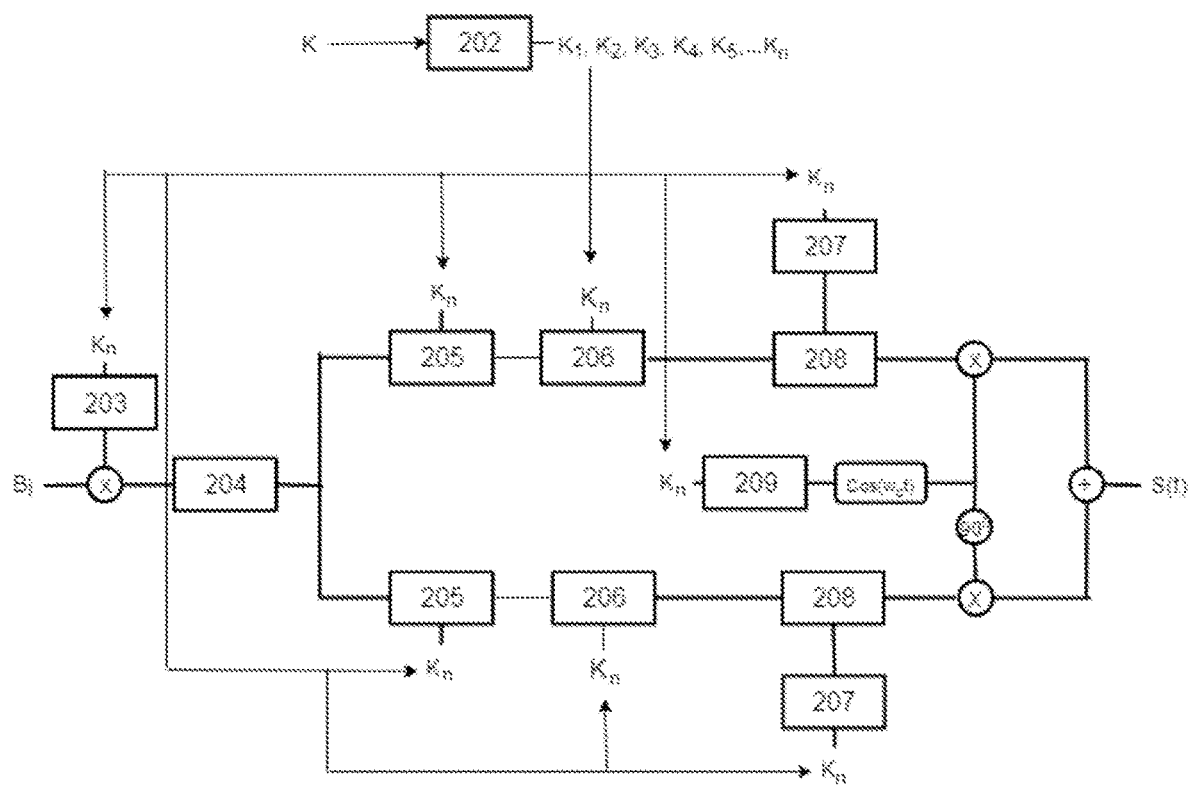
FIG. 6 is the representative view of the process steps that are carried out at the modulator by means of the method subject to the invention.
Figure 7:
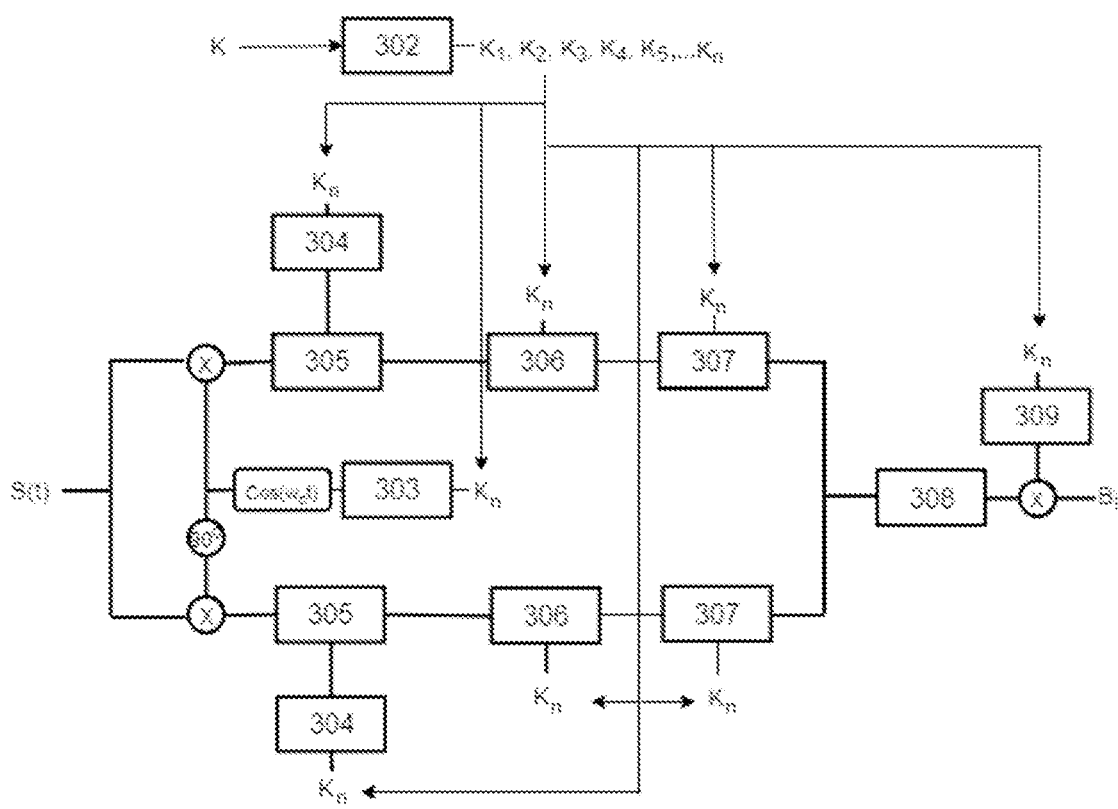
FIG. 7 is the representative view of the process steps that are carried out at the demodulator by means of the method subject to the invention.

The weak point of the security methods of the prior art and the inapplicability of such methods is caused by the key generation stage. This stage is carried out with channel-based key generation methods in the prior art. In this invention, the Diffie Hellman method that is used in cryptography methods has been used.

a: Secret key of the authorized transmitter
g: Base prime number
p: Mode prime number
A: The open key of the authorized transmitter
b: Authorized receiver secret key
B: Authorized receiver open key
K: Common key The Diffie Hellman key exchange protocol at the stage of key generation can be applied according to a classic application technique.

The authorized transmitter decides on the a, g and p numbers and generates an open key (A) from these numbers with the equation I and the authorized receiver decides on the b number (101), $$A = g^a \bmod p \quad (I),$$

The authorized transmitter transmits the A, G and p numbers to the authorized receiver (102), The authorized receiver generates its own open key (B) from the b, g and p numbers using equation II (103), $$B = g^b \bmod p \quad (II),$$

The authorized receiver transmits the B number to the authorized transmitter (104), The K common key is formed at the modulator and the demodulator by the authorized transmitter using equation III and by the authorized receiver using equation IV (105).

$$K = B^a \bmod p \quad (III),$$

$$K = A^b \bmod p \quad (IV),$$

A common key can be generated for physical layer security methods even in multiple receiver communications for group communications, by using group key exchange protocols that have been derived from the Diffie Hellman key generation technique.

The below-mentioned steps are carried out at the blocks of the modulators during the data transmission stage following the K key generation stage.

Dividing the equivalent of the K key number in a binary system into n equal parts and converting this n number in the binary system into its equivalent and generating an n key equation (V) (202),

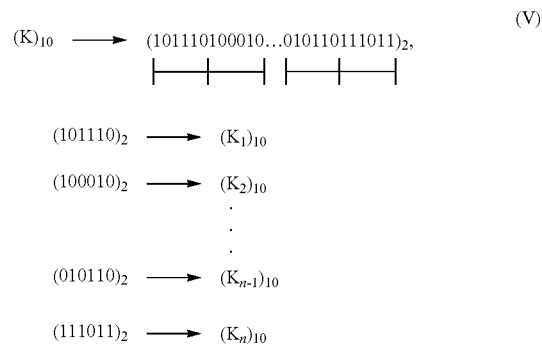

Establishing a chip sequence by means of a PN (Pseudo Noise) sequence generator according to any of the $K_n$ keys that have been generated for the direct sequence spread spectrum (203), Converting the bit sequence that is desired to be transmitted by the transmitter from serial format to parallel format by grouping before the modulation process (204), Converting the bit sequence that has been previously converted to parallel format, into an electromagnetic waveform such as in equation VI which represents the bit sequence (205), $$a \cdot e^{j\theta} \quad (VI),$$

a: the amplitude of the wave to be transmitted, θ: phase of the wave

Applying a constellation rotation security method by adding the $K_n$ number known by the transmitter and the receiver, that represents a key function with equation VII to the phase of the waveforms transmitted (207), $$a \cdot e^{j(\theta + Kn)} \quad (VII),$$

wherein: $0 < K_n < 360$

An RRC filter is established according to any of the $K_n$ keys that have been generated in order to apply the filter based security method (207), Passing the waveform from the low pass filter that has been formed (208), Preventing the listener from obtaining the data transmitted by applying a frequency hopping method according to any one of the $K_n$ keys that have been generated (209).

The below-mentioned processes are carried out at the blocks of the demodulator in order for the receiver to correctly demodulate the signal transmitted by the transmitter during the data transmission stage following the key generation stage.

Dividing the equivalent of the K key number in a binary system into n equal parts and converting this n number in the binary system into its equivalent and generating an n key equation (V) (302), Demodulating of the symbol by the receiver, where the transmitter applies frequency hopping with the $K_n$ key used in step number 209 (303), Establishing a low pass filter according to the $K_n$ number used in step 207 (304), Passing the waveform from the low pass filter that has been formed (305), Taking out the $K_n$ key in step 206 from the waveform phases applied with constellation rotation at the transmitter and converting it to its original state by means of a reverse constellation rotation carried out at the transmitter (306), selecting the demodulation type of original waveforms according to modulation type, in accordance with the $K_n$ key that is used in step 205 (307), changing the bit sequence that has been obtained in step 307 from parallel format into a serial format (308), Establishing a chip sequence according to $K_n$ number used in step 203 in order to obtain a data sequence for which a direct sequence spread spectrum is applied (309).

What is claimed is:

1. A method enabling a physical layer security method to be applied in a wireless communication by making changes during a key phase, wherein the method comprises the step of generating a K common key, and further comprises the following steps to be carried out at a modulator during a data transmission phase:

step 202) dividing an equivalent of a K key number in a binary system into n equal parts and converting an n number in the binary system into an equivalent of the n number and generating an n key equation (V), wherein the n key equation (V) is as follows:

$$(K)_{10} \longrightarrow (101110100010\ldots010110111011)_2, \quad (V)$$

$$(101110)_2 \longrightarrow (K_1)_{10}$$
$$(100010)_2 \longrightarrow (K_2)_{10}$$
$$\vdots$$
$$(010110)_2 \longrightarrow (K_{n-1})_{10}$$
$$(111011)_2 \longrightarrow (K_n)_{10}$$

step 203) establishing a chip sequence by a Pseudo Noise (PN) sequence generator according to any of $K_n$ keys generated for a direct sequence spread spectrum, step 204) converting a bit sequence desired to be transmitted by a transmitter from a serial format to a parallel format by grouping before a modulation process, step 205) converting the bit sequence previously converted to the parallel format, into an electromagnetic waveform such as an equation (VI) representing the bit sequence, wherein the equation (VI) is as follows:

$$a \cdot e^{j\theta} \quad (VI),$$

wherein a is an amplitude of a wave to be transmitted, and θ is a wave phase, step 206) applying a constellation rotation security method by adding a $K_n$ number known by the transmitter and a receiver, representing a key function with an equation (VII) to a phase of waveforms transmitted, wherein the equation (VII) is as follows:

$$a \cdot e^{j(\theta + Kn)} \quad (VII),$$

wherein: $0 < K_n < 360$, step 207) establishing an Root Raised Cosine (RRC) filter according to any of the $K_n$ keys generated to apply a filter based security method, step 208) passing the electromagnetic waveform from a low pass filter formed, step 209) preventing a listener from obtaining data transmitted by applying a frequency hopping method according to any one of the $K_n$ keys generated, wherein the method further comprising the process steps of, carrying out below-mentioned processes at a demodulator for the receiver to correctly demodulate a signal transmitted by the transmitter during the data transmission phase;

step 302) dividing the equivalent of the K key number in the binary system into the n equal parts and converting the n number in the binary system into the equivalent of the n number and generating the n key equation (V), step 303) demodulating of a symbol by the receiver, where the transmitter applies a frequency hopping with the $K_n$ key used in step 209), step 304) establishing the low pass filter according to the $K_n$ number used in step 207), step 305) passing the electromagnetic waveform from the low pass filter, step 306) taking out the $K_n$ key in step 206) from waveform phases applied with a constellation rotation at the transmitter and converting the $K_n$ key to an original state of the $K_n$ key by a reverse constellation rotation carried out at the transmitter, step 307) selecting a demodulation type of original waveforms according to a modulation type, in accordance with the $K_n$ key used in step 205), step 308) changing the bit sequence obtained in step 307) from the parallel format into the serial format, step 309) establishing the chip sequence according to the $K_n$ number used in step 203) to obtain a data sequence, wherein for obtaining the data sequence, the direct sequence spread spectrum is applied.

2. The method according to claim 1, wherein the K common key comprises the process steps of:

step 101) an authorized transmitter decides on a, g and p numbers and generates an open key (A) from the a, g and p numbers with an equation (I) and an authorized receiver decides on a b number, wherein the equation (I) is as follows:

$$A = g^a \bmod p \quad (I),$$

step 102) the authorized transmitter transmits the a, g and p numbers to the authorized receiver, step 103) the authorized receiver generates an own open key (B) of the authorized receiver from the b, g and p numbers using an equation (II), wherein the equation (II) is as follows:

$$B = g^b \bmod p \quad (II),$$

step 104) the authorized receiver transmits the b number to the authorized transmitter, step 105) the K common key is formed at the modulator and the demodulator by the authorized transmitter using an equation (III) and by the authorized receiver using an equation (IV), wherein the equation (III) and the equation (IV) are as follows:

$$K = B^a \bmod p \quad (III),$$

$$K = A^b \bmod p \quad (IV).$$

* * * * *